United States Patent
Lee et al.

(10) Patent No.: US 11,603,925 B1
(45) Date of Patent: Mar. 14, 2023

(54) HYDRAULICALLY ACTUATED CLUTCH SYSTEM AND CONTROL LOGIC FOR TORQUE CONVERTER ASSEMBLIES

(71) Applicant: GM GLOBAL TECHNOLOGY OPERATIONS LLC, Detroit, MI (US)

(72) Inventors: Chunhao J. Lee, Troy, MI (US); Norman K. Bucknor, Troy, MI (US); Dongxu Li, Troy, MI (US); Chengwu Duan, Shanghai (CN); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/560,560

(22) Filed: Dec. 23, 2021

(30) Foreign Application Priority Data

Nov. 30, 2021 (CN) .......................... 202111441373.9

(51) Int. Cl.
*F16H 45/02* (2006.01)
*F16H 61/14* (2006.01)
*F16H 61/00* (2006.01)

(52) U.S. Cl.
CPC ............ *F16H 61/143* (2013.01); *F16H 45/02* (2013.01); *F16H 2045/0205* (2013.01); *F16H 2045/0226* (2013.01); *F16H 2045/0284* (2013.01); *F16H 2061/0053* (2013.01)

(58) Field of Classification Search
CPC .................. F16H 61/143; F16H 45/02; F16H 2045/0205; F16H 2045/0226; F16H 2045/0284; F16H 2061/0053
See application file for complete search history.

(56) References Cited

U.S. PATENT DOCUMENTS

| | | | |
|---|---|---|---|
| 4,889,012 A | 12/1989 | Dull | |
| 6,126,568 A | 10/2000 | Sudau | |
| 9,394,981 B2 | 7/2016 | Lindemann et al. | |
| 9,856,958 B2 | 1/2018 | Basin et al. | |
| 10,006,517 B2 | 6/2018 | Li et al. | |
| 10,046,753 B2 * | 8/2018 | Yukawa | B60W 10/08 |

(Continued)

FOREIGN PATENT DOCUMENTS

| | | | | |
|---|---|---|---|---|
| DE | 2452126 A1 | 5/1976 | | |
| DE | 102008048029 A1 * | 3/2010 | ............ | F16H 45/02 |

(Continued)

*Primary Examiner* — Huan Le
(74) *Attorney, Agent, or Firm* — Quinn IP Law

(57) ABSTRACT

Presented are clutch control systems for torque converter (TC) assemblies, methods for making/operating such TC assemblies, and vehicles equipped with such TC assemblies. A TC assembly includes a housing that drivingly connects to an electric motor, and an output member that drivingly connects to a multi-gear transmission. Rotatable within the TC housing are a turbine attached to the TC output member and an impeller juxtaposed with the turbine. A lockup clutch is operable to lock the housing to the output member. A system controller is programmed to receive a shift signal to shift the powertrain from a neutral or park operating mode to a forward driving operating mode; responsive to receipt of this shift signal, the lockup clutch is opened. The system controller then receives a TCC lock signal to lock the lockup clutch; responsive to receipt of the TCC lock signal, the lockup clutch is closed.

22 Claims, 4 Drawing Sheets

(56) References Cited

U.S. PATENT DOCUMENTS

| | | | |
|---|---|---|---|
| 10,288,159 | B2 | 5/2019 | Li et al. |
| 10,293,674 | B1 | 5/2019 | Wilton |
| 10,337,597 | B2 | 7/2019 | Samie et al. |
| 10,576,837 | B2 | 3/2020 | Li et al. |
| 10,974,593 | B2 | 4/2021 | Duan et al. |
| 11,009,124 | B2 | 5/2021 | Li et al. |
| 2010/0273603 | A1 | 10/2010 | Roses et al. |
| 2014/0251744 | A1 | 9/2014 | Steinberger et al. |
| 2019/0168731 | A1 | 6/2019 | Lee et al. |

FOREIGN PATENT DOCUMENTS

| | | |
|---|---|---|
| DE | 102008048030 A1 | 3/2010 |
| JP | 62221806 A | 9/1987 |
| JP | 2011-231857 A | 11/2011 |
| JP | 2019-190521 A | 10/2019 |

\* cited by examiner

HYDRAULICALLY ACTUATED CLUTCH SYSTEM AND CONTROL LOGIC FOR TORQUE CONVERTER ASSEMBLIES

CLAIM OF PRIORITY AND CROSS-REFERENCE TO RELATED APPLICATION

This application claims the benefit of and priority to Chinese Patent Application No. 202111441373.9, which was filed on Nov. 30, 2021, and is incorporated herein by reference in its entirety and for all purposes.

INTRODUCTION

The present disclosure relates generally to powertrain systems for transmitting torque. More specifically, aspects of this disclosure relate to clutch control systems with attendant logic for hydrodynamic torque converters of electrified vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Vehicle powertrains employing an automatic transmission commonly insert a hydrodynamic torque converter (TC) between the engine and the multi-speed transmission to govern the transfer of rotational power therebetween. Conventional torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter acts as a fluid coupling with an impeller that is drivingly connected to the engine's crankshaft, and a turbine that is drivingly connected to the transmission's input shaft. Interposed between the impeller and turbine is a rotating stator that regulates fluid flow between their respective fluid volumes. A hydraulic pump modulates fluid pressure within the torque converter housing to regulate the amount of rotational energy that is transferred from the impeller to the turbine. A large difference in speed between the impeller and turbine results in torque multiplication of the impeller-received torque as, for example, when the vehicle launches from idle or rest.

Most modern torque converter assemblies are equipped with an internal "lockup" clutch mechanism that is selectively engaged to rigidly connect the engine's crankshaft to the transmission's input shaft when their speeds are nearly equal, e.g., to avoid unwanted slippage and resultant efficiency losses. System "slip" occurs because the rotational speed of the impeller relative to the rotational speed of the turbine, when unlocked, are inherently different. The torque converter clutch (TCC) operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during clutch-to-clutch shifts to eliminate undesired torque fluctuations and engine speed changes during transient periods when torque flow interruption is desired. A torsional isolating damper may be employed to attenuate torque-related vibrations transmitted between the engine and the transmission during TCC lockup. While conventionally employed in ICE and hybrid powertrains to govern engine torque, torque converters are now being employed within FEV powertrains so that the traction motor(s) may take advantage of the TC's torque multiplication features and driveline excitation isolation capabilities.

SUMMARY

Presented herein are clutch control systems with attendant logic for torque converter assemblies, torque-transmitting powertrains equipped with such TC assemblies, methods for making and methods for operating such TC assemblies, and vehicles equipped with such TC assemblies. By way of example, there are presented FEV powertrains with an electric drive unit (EDU) containing a motor/generator unit (MGU) drivingly coupled to a dedicated hydrodynamic TC assembly. The modular TC assembly may incorporate a TCC-type lockup clutch and a pump disconnect clutch (PDC) device that are both packaged inside the TC's fluid volume. The PDC device is axially spaced from the lockup clutch, inserted between an impeller (pump) shell and a transmission-side rear (pump) cover of the TC housing. The PDC device may be a friction-type clutch that is hydraulically actuable to friction-lock the impeller shell and blades to the rear pump cover and, thus, the MGU. Along the same lines, the TCC lockup clutch may be slidable on and splined to a TC output shaft, packaged between a turbine shell and a motor-side front (turbine) cover. The TCC lockup clutch may be a discrete friction-type clutch that is separately hydraulically actuable to friction-lock the front turbine cover to the TC's output shaft/member and, thus, the multi-gear transmission. An active or passive one-way clutch (OWC) device may be drivingly interposed between the turbine shell and the TC output shaft to carry positive motor torque to the transmission during motor-only driving modes.

For an automotive application, a resident or remote electronic system controller, such as a motor controller or powertrain control module (PCM), may receive a key-on command to start the vehicle powertrain. The system controller reacts by commanding or confirming the powertrain is in park (P) or neutral (N) and the TCC is closed/locked. A powertrain shift command is then received to transition to reverse (R), drive (D) or low gear (L); for a powertrain shift to R, the TCC is commanded to remain closed, whereas for a powertrain shift to D/L, the TCC is commanded to open. For the D/L operating mode, the TCC may thereafter be commanded closed, e.g., once the motor's output speed achieves the transmission's input speed. If a TCC lock command and corresponding conditions are not achieved, the TCC is commanded to remain open. After TCC lock for either R, D, or L, the system controller may thereafter receive a request to shift the powertrain into P or N; the TCC clutch control protocol may responsively loop to the beginning and start over.

Attendant benefits for at least some of the disclosed concepts include torque converter clutch control systems and shift schemes that enable usage of a torque converter in an all-electric powertrain architecture. Other attendant benefits may include novel motor-only launch control and high-torque tip-in control strategies that utilize TC torque multiplication and/or direct motor-to-driveline torque transfer under select conditions for more efficient torque generation and faster vehicle acceleration. Further concepts may include using the TC as a heat source for improved system thermal control (e.g., preconditioning the EDU and warming the passenger compartment in cold-start conditions). Disclosed features may also help to improve torque converter lockup and disconnect response times and to selectively isolate the motor from unwanted driveline excitations.

Aspects of this disclosure are directed to hydrodynamic torque converter assemblies with clutch control systems for improved motor response and EV efficiency. In an example, a torque converter assembly is presented that includes a TC housing that drivingly connects (e.g., via lugs and lug plate) to an output member (e.g., rotor shaft and hub) of an electric motor to receive torque generated by the motor. A TC output member (e.g., a central turbine shaft and/or transmission shaft) projects from the TC housing and drivingly connects to an input member (e.g., an input gear or shaft) of a transmission to transfer thereto motor-generated torque. Rotatably mounted within an internal fluid chamber of the TC housing is a bladed turbine and a bladed impeller separated by a bladed stator. The turbine is juxtaposed with the impeller and mounted onto the TC output member for common rotation therewith.

Continuing with the discussion of the above example, the torque converter assembly also includes a lockup clutch that is disposed inside the internal fluid chamber, e.g., between the turbine shell and front cover of the TC housing. The lockup clutch is selectively operable to lock the TC housing to the TC output member and, thus, the transmission input member for common rotation therewith. An electronic system controller, which may be a single device or network of devices, is programmed to receive and process a (first) shift signal with a command to shift the powertrain from a neutral or park operating mode to a forward driving operating mode (D, L, H, S, etc.); responsive to the received shift signal, the system controller commands the lockup clutch to open/unlock. The controller then receives a TCC lock signal with a request to lock the lockup clutch; in response, the system controller commands the lockup clutch to close/lock.

Additional aspects of this disclosure are directed to motor vehicles equipped with TC assemblies having clutch control capabilities for enhanced EV launch and tip-in driving maneuvers. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle includes a vehicle body with multiple road wheels, a passenger compartment, and other standard original equipment. An electric traction motor is mounted on the vehicle body and operates alone (e.g., for FEV powertrains) or in conjunction with an internal combustion engine assembly (e.g., for HEV powertrains) to drive one or more of the road wheels to thereby propel the vehicle. A multi-gear transmission is also mounted to the vehicle body and drivingly connects the prime mover(s) to the driven road wheel(s).

Continuing with the discussion of the above example, the vehicle also includes a torque converter assembly that operatively connects the prime mover(s) to the power transmission. This TC assembly includes a TC housing that is drivingly connected to the traction motor's rotor to thereby receive torque generated by the motor. A TC output member is attached to the TC housing and drivingly connected to the transmission to thereby transfer motor torque to the transmission. A turbine, which includes turbine blades mounted to a turbine shell, is attached to the TC output member and rotatable within the TC housing's internal fluid chamber. Likewise, an impeller with impeller blades is juxtaposed with the turbine and rotatable within the fluid chamber. A lockup clutch is disposed inside the fluid chamber, e.g., sandwiched between the turbine shell and TC housing. This lockup clutch is operable to lock the TC housing to the TC output member, e.g., to rotate in unison therewith.

For the aforementioned TC assembly, a resident or remote electronic controller or controller network is programmed to receive one or more shift signals indicative of a command to shift the powertrain from neutral or park to a forward driving mode of operation; responsively, the lockup clutch is commanded to open/unlock. The controller also receives one or more TCC lock signals indicative of a request to lock the lockup clutch; responsively, the lockup clutch is commanded to close/lock.

Also presented herein are system control logic, closed-loop feedback control techniques, and computer-readable media (CRM) for manufacturing and/or for operating any of the disclosed torque converter assemblies, powertrains, and/or motor vehicles. In an example, a method is presented for controlling a torque converter assembly for drivingly connecting a prime mover with a transmission. This representative method includes, in any order and in any combination with any of the above and below disclosed options and features: receiving, via an electronic system controller, a first shift signal indicative of a command to shift the powertrain from a neutral or park operating mode to a forward driving operating mode, the TC assembly including a TC housing drivingly connected to the output member to thereby receive torque generated by the electric motor, a TC output member drivingly connected to the input member to thereby transfer torque to the transmission, a turbine attached to the TC output member and including turbine blades rotatable within the fluid chamber, an impeller including impeller blades juxtaposed with the turbine blades and rotatable within the internal fluid chamber, and a lockup clutch operable to lock the TC housing to the TC output member; transmitting, via the system controller responsive to receipt of the first shift signal, a command signal to open the lockup clutch; receiving a TCC lock signal indicative of a request to lock the lockup clutch; and transmitting, via the system controller responsive to receipt of the TCC lock signal, a command signal to close the lockup clutch.

For any of the disclosed vehicles, TC assemblies, and methods, the system controller may be programmed to receive another (second) shift signal with a command to shift the powertrain from the forward driving operating mode back into the N/P operating mode; responsively, the controller commands the lockup clutch to remain closed during the transition to N/P. As yet a further option, the controller may receive another (third) shift signal with a command to shift the powertrain from the N/P operating mode to a rearward driving (reverse) operating mode; responsively, the controller commands the lockup clutch to close. In this instance, the controller may receive a different (fourth) shift signal with a command to shift the powertrain from R to the N/P; in response, the controller commands the lockup clutch to remain closed during the transition to neutral or park.

For any of the disclosed vehicles, TC assemblies, and methods, the system controller may be programmed to receive a key-on signal with a command to initialize the powertrain system. After electronic powertrain ignition, the controller receives an operating mode signal indicating the motor vehicle is in neutral or park. For example, the powertrain may be a vehicle powertrain; in this instance, the key-on signal may be received from a driver of the motor vehicle via a manually activated ignition system (e.g., key fob or starter push button), and the operating mode signal may be received from a manually operated electronic mode shifter device (e.g., shift knob or dial).

For any of the disclosed vehicles, TC assemblies, and methods, the controller may be programmed to determine if the powertrain is in park or neutral and, if so, determine if a real-time or near real-time motor temperature of the electric motor is less than a motor-calibrated minimum allowable motor operating temperature (e.g., for propulsion). Responsive to the motor's temperature being less than the minimum allowable motor temperature, the controller may command the TC assembly to execute a system preconditioning operation (vehicle stopped), which may include commanding the powertrain to remain in P/N, commanding the lockup clutch to close, and commanding the electric motor to operate at or above a predefined minimum motor speed. As another option, the controller may be programmed to determine if the powertrain is in a forward driving mode and, if so, responsively determine if the motor's current operating temperature is less than the minimum allowable motor operating temperature. Responsive to the motor temperature being less than the minimum allowable operating temperature, the controller may command the TC assembly to execute a system preconditioning operation (vehicle driving), which may include commanding the lockup clutch to partially close and slip, and commanding the motor to output motor torque to the TC housing.

For any of the disclosed vehicles, TC assemblies, and methods, the TC housing may be a bipartite construction fabricated with a pump cover, which circumscribes the impeller, and a turbine cover, which circumscribes the turbine and is rigidly mounted to the pump cover. A mechanical pump may be drivingly connected to the pump cover and/or turbine cover to be driven by the motor. A disconnect clutch may include a disconnect clutch (DC) flange that projects, e.g., radially outward, from an impeller shell of the impeller. The DC flange includes a DC friction surface that friction-locks to the TC housing. In a more specific example, a DC clutch disc pack (stacked pressure discs) projects from an inner surface of the pump cover; the DC friction surface includes a DC clutch plate pack (stacked friction plates) that is interleaved with and selectively locks to the DC clutch disc pack. As yet a further option, the lockup clutch includes a TCC hub that is slidably mounted onto the TC output member to rotate in unison therewith. The TCC hub includes a TCC friction surface that friction-locks to the TC housing. In a more specific example, a TCC clutch disc pack (stacked pressure discs) projects axially from an inner surface of the turbine cover; the TCC friction surface includes a TCC clutch plate pack (stacked friction plates) that is interleaved with and locks to the TCC clutch disc pack.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
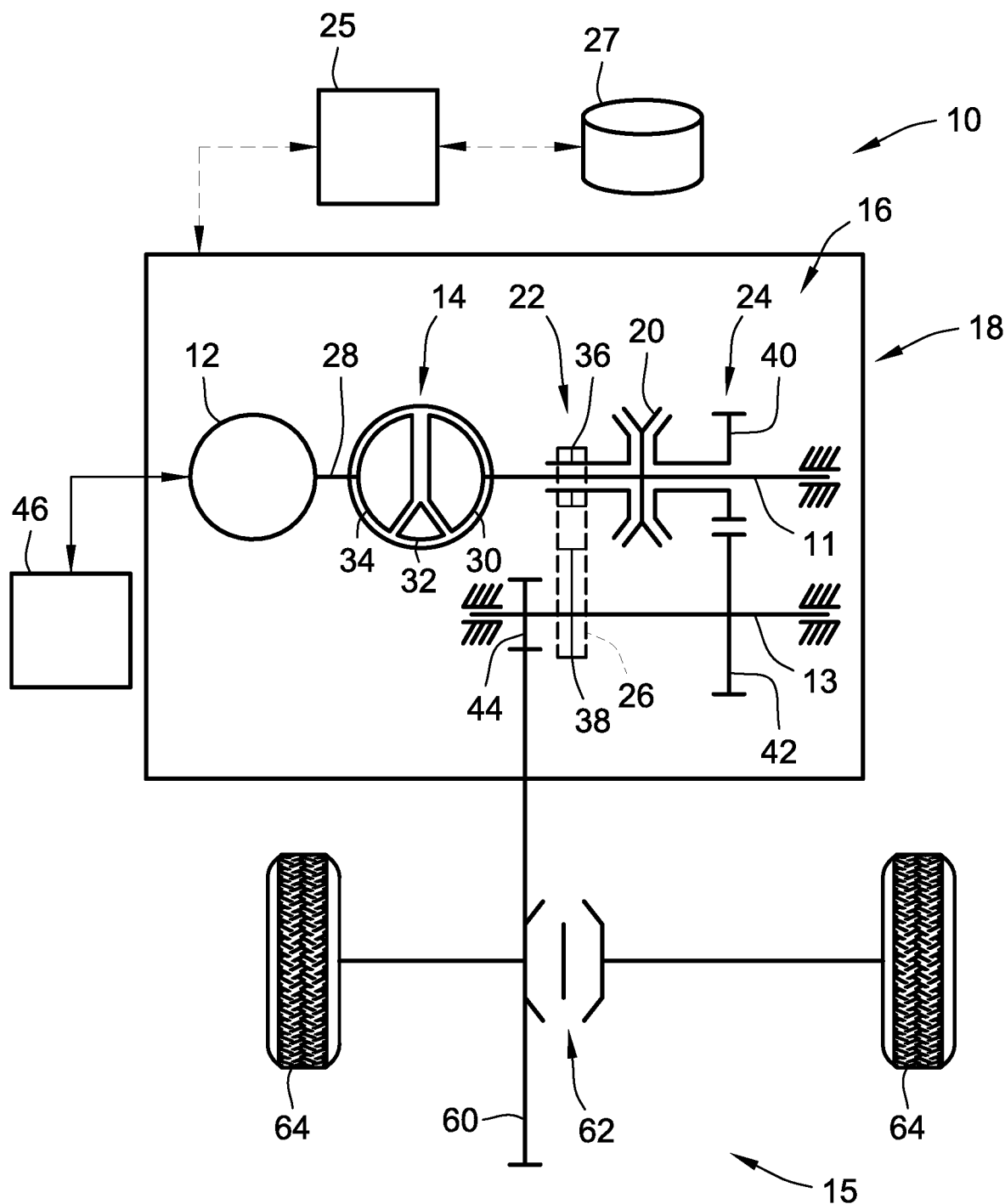
FIG. 1 is a schematic illustration of a representative electric-drive vehicle with a full-electric powertrain having a motor/generator unit drivingly connected to a multi-gear power transmission via a hydrodynamic torque converter in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a transverse-mount, EDU-propelled FEV powertrain. The illustrated automobile 10—also referred to herein as "motor vehicle" or "vehicle" for short—is merely an exemplary application with which aspects of this disclosure may be practiced. In the same vein, utilization of the present concepts for an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for automotive and non-automotive applications alike. Moreover, only select components of the motor vehicles, electrified powertrains, and torque converter assemblies are shown and described in additional detail herein. Nevertheless, the vehicles, powertrains, and TC assemblies discussed below may include numerous additional and alternative features, and other available peripheral components, for carrying out the various methods and functions of this disclosure.

The FEV powertrain of FIG. 1 employs an electric motor/generator unit 12 that is drivingly connected via a hydrodynamic torque converter 14 to a multi-gear power transmission 16, all of which may be packaged as a self-contained, modular electric drive unit 18, e.g., with integrated electronics package and thermal management system. In accord with the illustrated example, the transmission 16 is generally composed of first and second parallel shafts 11 and 13, respectively, a gear-shifting synchronizer 20 on the first shaft 11, first and second coplanar gear sets 22 and 24, respectively, drivingly connecting the first and second shafts 11, 13, and a torque-transmitting transfer member 26 on the first gear set 22. It should be appreciated that the transmission 16 of FIG. 1 is purely representative in nature and may optionally take on other suitable configurations, including multi-speed automatic transmissions, Continuously Variable Transmission (CVT) architectures, automated-manual transmissions, epicyclic gear arrangements, etc.

For vehicle propulsion, the motor/generator unit 12 may be in the nature of an electric traction motor that output tractive torque through a rotor 28 (also referred to herein as "motor output member") by converting stored electrical power into rotational mechanical force. The MGU 12 may be directly coupled onto a TC input member or drivingly mounted to a housing portion of the torque converter 14 and, through the TC, drivingly connected to an input shaft or member of the transmission 16. While shown as an all-electric architecture with a single motor in serial power-flow communication with a single vehicle axle, the vehicle 10 may employ other powertrain configurations, including P1 and P2 hybrid powertrains, as well as other FEV and standard powertrain architectures. In this regard, the MGU 12 may be replaced by other types of prime movers for the powertrain of vehicle 10 without departing from the present disclosure. For example, an internal combustion engine assembly may be employed, in addition to or as a substitute for one or more MGUs, to provide torque to the vehicle's final drive 15.

The electric motor/generator unit 12 may be an induction-type squirrel cage motor or a permanent-magnet (PM) type asynchronous motor composed of an annular stator (not shown) circumscribing and concentric with the rotor 28. Electric power may be provided to the stator through electrical conductors or cables that pass through the motor housing in suitable sealing and insulating feedthroughs (not illustrated). Conversely, electric power may be provided from the MGU 12 to an onboard traction battery pack or similarly suitable electric vehicle battery (EVB) 46, e.g., through regenerative braking. Operation of any of the illustrated powertrain components may be governed by an onboard or remote vehicle controller, such as programmable electronic control unit (ECU) 25.

Hydrokinetic torque converter assembly 14 operates as a fluid coupling for operatively connecting and disconnecting the motor 12 to and from the internal gearing of the power transmission 16. Disposed within an internal fluid chamber of the TC assembly 14 are a bladed turbine 30, a bladed impeller 34 juxtaposed with the turbine 30, and a bladed stator 32 interposed between and coaxial with the turbine 30 and impeller 34. As shown, the turbine 30 is connectable for common rotation with the first shaft 11 of the transmission 16, whereas the impeller 34 is connectable for common rotation with the rotor 28 of the MGU 12. The stator 32 alters the flow of fluid between the turbine 30 and the impeller 34 such that returning fluid aids, rather than impedes, rotation of the impeller 34. In so doing, the stator 32 provides a mechanism for multiplying the torque transmitted from the turbine 30 to the impeller 34.

With continuing reference to FIG. 1, each of the two coplanar gear sets 22, 24 includes a pair of mated gears. In particular, a first gear 36 of the first coplanar gear set 22 is rotatably supported on and concentric with the first shaft 11. A second gear 38 of the first coplanar gear set 22 is supported on and rotates in unison with the second shaft 13.

The transfer member 26 drivingly connects the first gear 36 to the second gear 38 of the first coplanar gear set 22. The transfer member 26 may be a chain, a gear, a belt, or some other element used to maintain the transfer of torque between the first gear 36 and the second gear 38 of the first coplanar gear set 22 while maintaining the same direction of rotation for both gears 36, 38.

A first gear 40 of the second coplanar gear set 24 is also rotatably supported on and concentric with the first shaft 11, whereas a second gear 42 of the second coplanar gear set 24 is supported on and rotates in unison with the second shaft 13. The first and second gears 40, 42 of the second coplanar gear set 24 are intermeshed with each other to transmit torque therebetween. In this manner, the transfer of torque from the first gear 40 to the second gear 42 of the second coplanar gear set 24 occurs with a change in rotational direction between the first and second gears 40, 42. An output gear 44, which is axially spaced from the first and second gear sets 22, 24, is supported on and rotates in unison with the second shaft 13. This output gear 44 meshes with a complementary ring gear 60 of a front or rear differential 62 of the vehicle's final drive system 15. The differential 62 provides a torque pathway to one or more axles and one or more drive wheels 64 of the electric-drive vehicle 10. Although not explicitly portrayed in FIG. 1, it should be appreciated that the final drive system 15 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

The synchronizer 20 may have an inner spline that mates with a complementary spline on the first shaft 11 providing common rotation between the synchronizer 20 and the first shaft 11 while maintaining relative axial movement of the synchronizer 20 on the first shaft 11. In this manner, the synchronizer 20 is selectively relocated between at least three distinct axial positions by sliding the synchronizer 20 on the first shaft 11. When the synchronizer 20 is disposed in a first "neutral" position, for example, the first shaft 11 may rotate freely relative to the first gears 36, 40 of the first and second coplanar gear sets 22, 24. The synchronizer 20 may be slid along the first shaft 11 to a second "forward" position in order to engage for common rotation with the first gear 40 of the second coplanar gear set 24. In this manner, the first gear 40 rotates in unison with both the synchronizer 20 and the first shaft 11.

Continuing with the above discussion of the transmission's 16 different operating modes, the synchronizer 20 may be slid along the first shaft 11 to a third "reverse" position to thereby engage for common rotation with the first gear 36 of the first coplanar gear set 22. Similar to the second position, the third position provides for common rotation between the first gear 36 of the first coplanar gear set 22 and the first shaft 11. However, since the first gear 36 is coupled to the second gear 38 through the transfer member 26 and not via meshing gears, the second gear 38 and, thus, the second shaft 13, the output gear 44, and differential 62 rotate in reverse. In this manner, a reverse gear ratio is achieved which maintains the same rotation direction of the MGU 12. The resulting transmission 16 architecture allows the EDU 18 to utilize the torque multiplication of the torque converter 14 while providing a reverse direction on the drive wheels 64.

Figure 2:
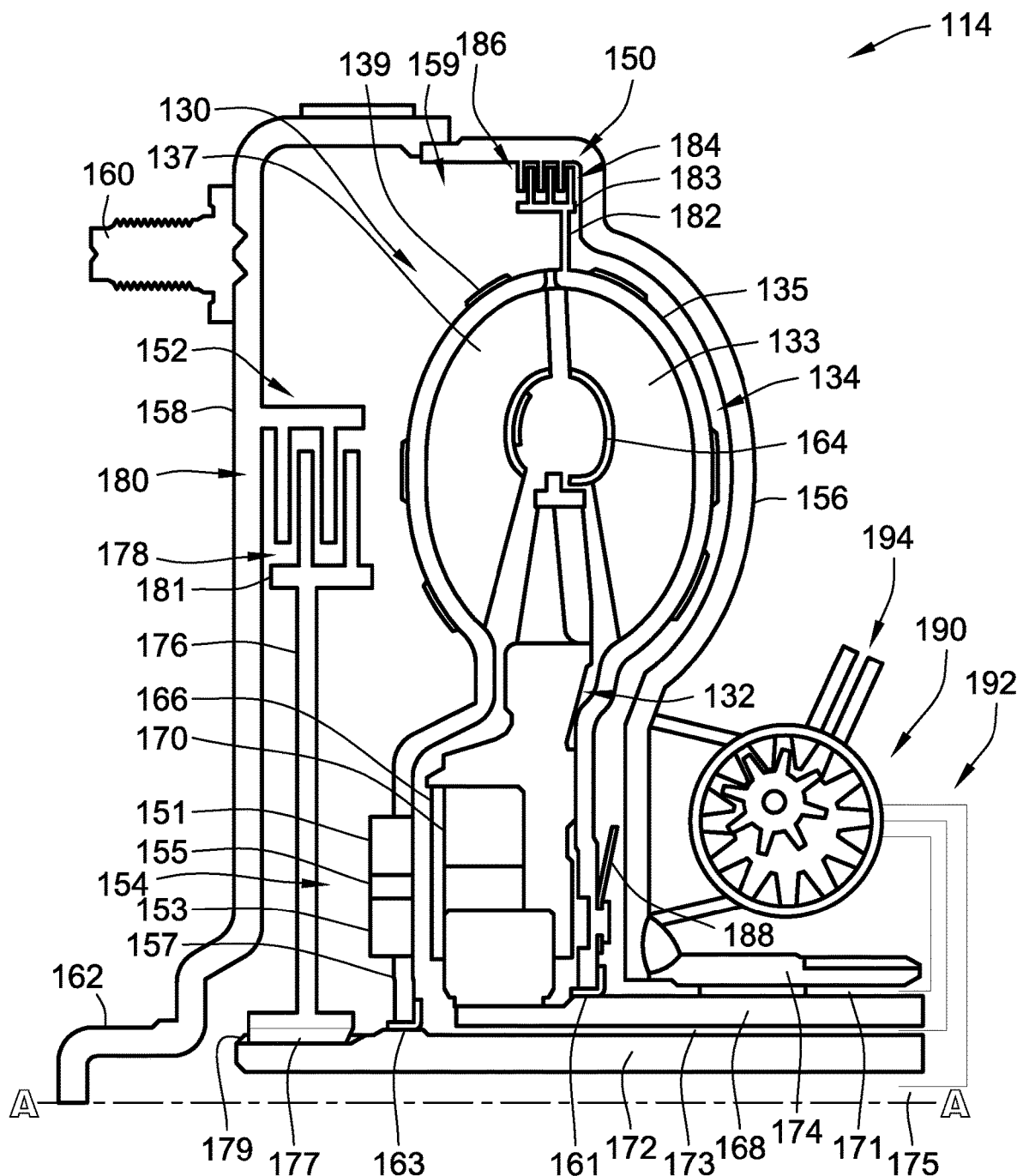
FIG. 2 is a partially schematic, sectional side-view illustration of select portions of a representative hydrodynamic torque converter assembly with a hydraulic control system for combined clutch control, converter feed, and lubrication in accordance with aspects of the present disclosure.

FIG. 2 is a side-view illustration of an upper half of a representative torque converter assembly 114 that may be adapted for both automotive applications (e.g., for TC 14 of vehicle 10 in FIG. 1) and non-automotive applications (e.g., watercraft, aircraft, and train propulsion, industrial power systems, drilling rigs, etc.). TC assembly 114 of FIG. 2 is taken in cross-section along a vertical plane that passes through the assembly's central axis of rotation A-A (cross-hatching omitted for ease of reference). It should be appreciated that a cross-sectional, side-view illustration of the lower half of the TC assembly 114 may be a near-identical, mirrored image to that shown in FIG. 2. The torque converter 114 is assembled with a motor-driven impeller 134, an impeller-driven turbine 130, a fluid-flow altering stator 132, a pump disconnect clutch (DC) 150 device, a motor-to-transmission lockup clutch 152 device, and a one-way clutch (OWC) 154 device.

To protect the working internal components of the torque converter 114, the assembly is constructed with a fluid-tight, annular housing that is defined principally by a transmission-side rear pump cover 156 that is fixedly attached, e.g., via electron beam welding, MIG or MAG welding, laser welding, and the like, to a motor-side front turbine cover 158 such that a working hydraulic fluid chamber 159 is formed therebetween. The TC housing's front cover 158 may be drivingly connected to an output member of an electric motor (e.g., rotor 28 of motor 12 in FIG. 1), e.g., via a series of circumferentially spaced lugs 160 or splined engagement with a cylindrical housing hub 162 projecting axially from the center of the front cover 158. Mechanically coupling the front cover 158 to the motor's output member enables the transfer of rotational power back-and-forth between the motor and TC assembly 114.

The impeller 134—also referred to in the art as "pump"—is situated in serial power-flow fluid communication with the turbine 130. Interposed between the impeller 134 and turbine 130 is a bladed stator 132 that selectively alters fluid flow returning from the turbine 130 to the impeller 134 such that this fluid aids, rather than impedes, rotation of the impeller 134. For instance, TC assembly 114 may be utilized to transfer motor torque from the rotor 28 of MGU 12 to the input shaft 11 of transmission 16 through the manipulation of hydraulic fluid inside the fluid chamber 159. More specifically, rotation of impeller blades 133, which are mounted to a compliant impeller shell 135 located between the pump cover 156 and an inner shroud 164, causes the hydraulic fluid to flow forward and toroidally outward toward the turbine 130. When this occurs with sufficient force to overcome inertial resistance to rotation, turbine blades 137 located in face-to-face relation with the impeller blades 133 will begin to rotate with the impeller 134. These turbine blades 137 are coaxially oriented with the impeller blades 133 and mounted on a compliant turbine shell 139 located between the front cover 158 and the inner shroud 164. The fluid flow exiting the turbine 130 is directed back into the impeller 134 by way of the stator 132. The stator 132—rotatably mounted between the flow exit section of the turbine 130 and the flow entrance section of the impeller 134—redirects the fluid flow from the turbine blades 137 to the impeller blades 133 in the same direction as impeller rotation, thereby reducing pump torque and causing torque multiplication.

Also disposed within the protective outer housing 156, 158 of the torque converter assembly 114 is a thrust bearing 166 that rotatably supports the stator 132. The stator 132 is connected to a hollow stator shaft 168 by way of a roller clutch 170 that is operable to prevent rotation of the stator 132 under calibrated operating conditions. At higher torque converter speeds, for example, the direction of hydraulic fluid leaving the turbine 130 changes, causing the stator 132 to over-run the roller clutch 170 and rotate freely on the stator shaft 168. Projecting axially rearward from the TC housing (to the right in FIG. 2), the stator shaft 168 and a hollow turbine shaft 172 are rotatably encased inside an outer pump hub 174, which may be fluidly sealed to a transmission housing or chamber.

Impeller shell 135 may be bendably or slidably attached, e.g., via splined engagement or mount collar 161, for common rotation on the stator shaft 168. In the same vein, the turbine shell 139 may be bendably or slidably attached, e.g., via splined engagement or mount collar 163, for common rotation on the turbine shaft 172 (also referred to herein as "TC output member"). As shown, the pump hub 174 circumscribes the stator shaft 168 to cooperatively define therebetween a first fluid path 171 through which flows hydraulic fluid for controlled activation of the TC assembly 114. Along the same lines, the stator shaft 168 circumscribes the turbine shaft 172 to cooperatively define therebetween a second fluid path 173 that passes therethrough hydraulic fluid. A longitudinally elongated central cavity of the turbine shaft 172 defines a third fluid path 175. All three hydraulic fluid paths 171, 173, 175 are fluidly connected to a supply of hydraulic fluid, such as a transmission oil sump or EDU sump volume (not shown), and independently modulated to govern operation of the TC assembly 114.

Located inside the working hydraulic fluid chamber 159, interposed between the turbine 130 and turbine cover 158, is a TCC-type lockup clutch 152 that operates to provide a direct driving connection between a prime mover and a torque-modifying transmission (e.g., motor 12 and transmission 16 of FIG. 1). In particular, closing and frictionally locking the lockup clutch 152 will mechanically lock the housing's front cover 158, which couples at the motor output member, to the turbine shaft 172, which couples at the transmission input member. In accord with the illustrated example, the lockup clutch 152 includes a disc-shaped TCC hub 176 that is mounted onto the turbine shaft 172, e.g., via meshing internal and external spline teeth 177 and 179, respectively, for common rotation therewith. Projecting radially outward from an axial flange 181 on the outer perimeter of the TCC hub 176 is a TCC clutch plate pack 178 composed of mutually parallel, axially spaced, and radially aligned friction plates. Projecting axially from an inner surface of the turbine cover 158 is a TCC clutch disc pack 180 composed of mutually parallel, axially spaced, and radially elongated pressure discs that are interleaved with the friction plates of the TCC clutch plate pack 178. Alternatively, the friction plates may be rigidly secured to the turbine cover 158 and the pressure plates may be secured to the lockup clutch 152.

Activation and deactivation of the lockup clutch 152 and associated friction material on the clutch pack 178 plates is achieved via axial sliding and/or fore-aft bending movement of the TCC hub 176 on the turbine shaft 172 in response to modulated hydraulic fluid flow into the fluid chamber 159. In particular, the lockup clutch 152 is activated through increased hydraulic pressure on a rearward face of the TCC hub 176 (rightward facing major surface in FIG. 2), which may be provisioned via inlet fluid flow along the first fluid path 171 between the pump hub 174 and stator shaft 168. On the other hand, lockup clutch 152 deactivation is achieved through increased hydraulic pressure on a forward face of the TCC hub 176 (leftward facing major surface in FIG. 2), which may be provisioned via inlet fluid flow along the third fluid path 175.

When the lockup clutch 152 is closed and locked, i.e., with no slip between the pressure discs in the TCC clutch disc pack 180 and the friction plates in the TCC clutch plate pack 178, the motor 12 effectively circumvents the TC turbine 130 and impeller 134 and transmits power directly to the transmission 16. An optional biasing member, such as a leaf spring (not shown), may be compressed between the inner surface of the front cover 158 and the forward face of the TCC hub 176, pushes the lockup clutch 152 rearwards towards a non-torque-carrying deactivated position (e.g., to the right in FIG. 2). It should be appreciated that the disconnect clutch 150 and lockup clutch 152 may take on other hydraulic clutch configurations, such as dog clutch or single friction surface clutch designs, within the scope of this disclosure.

Integrated into the TC assembly 114 of FIG. 2 is a motor-isolating disconnect clutch device 150 for drivingly connecting and, when desired, disconnecting the electric motor to/from the multi-gear transmission. Similar to the aforementioned lockup clutch 152, the disconnect clutch device 150 of FIG. 2 is embodied as a hydraulically activated friction-type clutch device that is packaged within the fluid chamber 159 of the TC housing 156, 158. As shown, the disconnect clutch device 150 is positioned between the impeller shell 135 and the pump cover 156, providing a direct mechanical interface between the impeller 134 and TC housing 156, 158. Disconnect clutch 152 includes an annular DC flange 182 that is integrally formed with or otherwise attached onto an outer perimeter of the impeller shell 135. The DC flange 182 may be an annular rim that projects radially outward from and extends around the outermost edge of impeller shell 135. To allow fluid from the first fluid path 171 to travel around the impeller 134 and through the disconnect clutch 150, the DC flange 182 may be discontinuous or slotted. A DC clutch plate pack 184 composed of mutually parallel, axially spaced, and radially aligned friction plates projects radially outward from an axial flange 183 on the outer perimeter of the DC flange 182. Projecting radially inward from an inner surface of the pump cover 156 is a DC clutch disc pack 186 composed of mutually parallel, axially spaced, and radially aligned pressure discs that are interleaved with the friction plates of the DC clutch plate pack 184.

Activation and deactivation of the disconnect clutch 150 is achieved via axial sliding and/or fore-aft bending movement of the impeller shell 135 on the stator shaft 168 in response to modulated hydraulic fluid flow into the fluid chamber 159. Similar to the lockup clutch 152, the disconnect clutch 150 is activated through increased hydraulic pressure on a rearward face of the impeller shell 135, which is provisioned via the same inlet fluid flow through the first fluid path 171. On the other hand, disconnect clutch 150 deactivation is achieved through increased hydraulic pressure on a forward face of the impeller shell 135, which is provisioned via inlet fluid flow along the second fluid path 173. When the disconnect clutch 150 is closed and locked, i.e., with no slip between the pressure discs in the DC clutch disc pack 186 and the friction plates in the DC clutch plate pack 184, the motor 12 is drivingly connected to the impeller 134 for rotation in unison therewith. An optional biasing member, such as a leaf spring 188 compressed between the inner surface of the rear cover 156 and the rear face of the impeller shell 135, pushes the disconnect clutch 150 into a torque-carrying activated position (e.g., to the left in FIG. 2).

Continuing with the discussion of the torque converter assembly 114 of FIG. 2, a one-way clutch device 154 is mechanically interposed between the turbine shell 139 and the TC output member 172. This OWC 154 may be a passive-type unidirectional overrunning clutch that functions to automatically operatively connect (or "lock") the turbine shell 139 and, thus, the turbine 130 to the turbine shaft 172. In this manner, the OWC 154 drivingly connects the turbine 130 to the transmission, e.g., when the motor generates positive torque. In the illustrated example, the OWC 154 includes an annular outer race 151 that is concentrically aligned within an annular inner race 153. The outer race 151 is bolted, riveted, welded, and/or integrally formed with (collectively "rigidly attached") a radially inner edge of the turbine shell 139 to rotate in unison therewith. By comparison, the inner race 153 is rigidly attached to an outer periphery of a turbine hub 157 to rotate in unison therewith. It is envisioned that other OWC designs may be implemented, including those with axially spaced, face-to-face races, rather than concentric inner and outer races, as well as active one-way and two-way clutch devices.

Disposed between and selectively rotatably coupling the outer and inner races 151, 153 of the OWC 154 is a series of circumferentially spaced torque transmitting elements 155. These torque transmitting elements 155 may comprise identically shaped and sized spring-biased cylindrical rollers; alternative configurations may incorporate any number, type, and combination of torque transmitting elements, including tapered rollers, needle rollers, sprags, pawls, struts, etc. When disengaged, the torque transmitting elements 155 are in an "unwedged" state to allow overrunning rotational motion of the outer race 151 relative to the inner race 153 in a first (negative) direction. When engaged, the torque transmitting elements 155 are in a "wedged" state to allow unitary rotational motion of the outer race 151 with the inner race 153 in a second (positive) direction. Optional biasing elements (not shown) may press or otherwise "preload" the torque transmitting elements 155 to the wedged position.

To enable combined converter feed, clutch control, and lubrication, a mechanical fluid pump 190 is fluidly coupled to the TC housing and drivingly connected to the electric motor. In accord with the illustrated example, a single fluid pump 190 is mounted within the EDU 18, e.g., adjacent an outer surface of the pump cover 156. It should be appreciated, however, that the fluid pump 190 may be packaged at other discrete locations, both inside and outside the outer casing of the EDU 18 of FIG. 1. Fluid conduits 192, which may be in the nature of fluid pipes, fittings, valves, channels, etc., fluidly couple the fluid pump 190 to the fluid paths 171, 173, 175 inside the TC housing 156, 158. Although illustrated as a gerotor-type positive displacement pump, the fluid pump 190 may take on alternative designs, including screw pumps, reciprocating pumps, and lobe pumps.

The mechanical pump 190 may be packaged in an "on axis" configuration with its rotor shaft coaxially mounted on the same axis of rotation A-A as the TC assembly 14. In this instance, the pump 190 may be directly connected to the pump hub 174 and/or rotor 28 for rotation by the electric motor 12 of FIG. 1, for example. With this architecture, the pump 190 may rotate at the same speed as the motor 12. Comparatively, for an "off axis" configuration, the mechanical pump 190 may be packaged with its rotor shaft mounted on an axis of rotation that is distinct from the axis A-A of the TC assembly 14. An optional pump drive system 194, such as a gear train, chain drive, or belt drive (shown), drivingly connects the pump 190, directly or indirectly, to the hub 174 and/or rotor 28 of the MGU 12 to be powered by the motor 12. With this architecture, the pump 190 may rotate at the same speed as or at a constant ratio to the speed of motor 12. When driven by a motor 12, the fluid pump 190 feeds hydraulic fluid from a fluid sump (FIG. 3), through the pump hub 174, and into the working hydraulic fluid chamber 159 of the TC housing 156, 158. Doing so increases pressure within the fluid chamber 159 so as to: (1) activate the fluid coupling between the turbine 130 and impeller 134; (2) activate the disconnect and lockup clutches 150, 152, as described above; (3) draw thermal energy out of the TC assembly 114; and (4) provide lubrication for the internal working components of the TC assembly 114.

Figure 3:
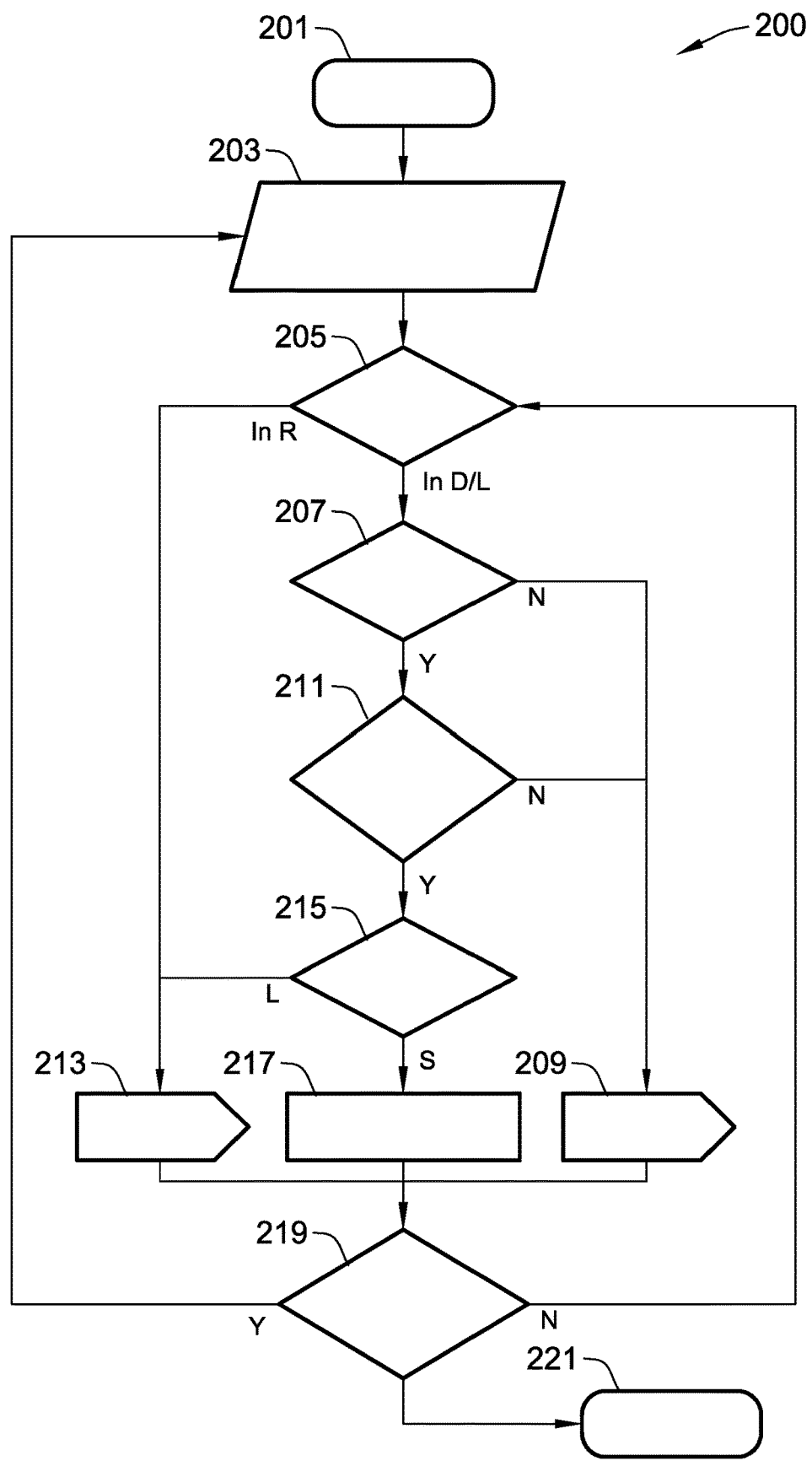
FIG. 3 is a flowchart illustrating a representative clutch control protocol for operating a torque converter assembly, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 3, an improved method or control strategy for system-automated clutch control for a torque converter assembly, such as TC assembly 114 of FIGS. 2 and 3, for operating a motor vehicle, such as automobile 10 of FIG. 1, is generally described at 200 in accordance with aspects of the present disclosure. Some or all of the operations illustrated in FIG. 3, and described in further detail below, may be representative of an algorithm that corresponds to processor-executable instructions that are stored, for example, in main or auxiliary or remote memory (e.g., memory device 27 of FIG. 1), and executed, for example, by an electronic controller, processing unit, logic circuit, or other module or device or network of modules/devices (e.g., ECU 25 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 200 of FIG. 3 begins at START terminal block 201 with memory-stored, processor-executable instructions for a programmable controller or control module or similarly suitable processor to call up an initialization procedure for launch/tip-in clutch pressure control. System evaluation for provisioning this routine may be executed in real-time, near real-time, continuously, systematically, sporadically, and/or at regular intervals, for example, each 10 or 100 milliseconds during normal and ongoing operation of the motor vehicle 10. As yet another option, terminal block 201 may initialize responsive to a user command prompt, a resident vehicle controller prompt, or a broadcast prompt signal received from an "off-board" centralized vehicle services system (e.g., a host cloud computing service). As a non-limiting example, an operator of the motor vehicle 10—be it a human or computerized driver—may input an ignition command or a pedal tip-in command from idle speed or zero speed, e.g., by depression of an accelerator pedal when the pedal has been fully released. Upon completion of the control operations presented in FIG. 3, the method 200 may advance to END terminal block 221 and temporarily terminate or, optionally, may loop back to terminal block 201 and run in a continuous loop.

Upon initialization of the clutch control protocol, method 200 advances to input/output block 203 to process a request for propulsion start and a PRNDL (park-rear-neutral-drive-low) setting of park (P) or neutral (N). For instance, ECU 25 of FIG. 1 may receive one or more key-on command signals from a manually activated electronic ignition system (e.g., a hand-held key fob or an in-vehicle starter push button) of vehicle 10 with a request from a driver or vehicle occupant to initialize the EDU 18 and other requisite powertrain hardware. At the same time, the ECU 25 may receive one or more operating mode signals from a manually operated electronic mode shifter device (e.g., an in-vehicle shift knob or dial) of vehicle 10 that indicates the vehicle 10 is in a neutral or park operating mode. It is envisioned that any of the herein mentioned shift commands, torque commands, etc., may be generated by an autonomous vehicle control (AVC) module or an advanced driver assistance system (ADAS) module. At this juncture, the ECU 25 may command the TCC-type lockup clutch 152 to close/lock while the vehicle 10 remains in P/N.

Method 200 thereafter executes decision block 205 to determine if a PRNDL shift is received to transition to a forward driving operating mode or a rearward driving operating mode. With reference again to the representative applications of FIGS. 1 and 2, the ECU 25 may receive a (first) shift command signal from an in-vehicle shift knob/dial with a request to shift the EDU 18 from P/N to a forward driving mode, such as drive (D), low (L), high (H) or sport (S). Alternatively, the ECU 25 may receive a different (third) shift command signal with a request to shift the EDU 18 from P/N to reverse (R). It should be appreciated that a shift from P to D or R may be part of a vehicle launch operation whereas a shift from N to D or R may be part of a tip-in operation during movement of the vehicle 10.

If a PRNDL shift command from P/N to D/L/H/S is received (block 205=D/L), method 200 moves to decision block 207 to determine if a real-time or near real-time current speed of the motor vehicle is greater than a predefined minimum (low) vehicle speed. If not (block 207=NO), method 200 responsively commands the torque converter assembly to unlock at signal output block 209. For instance, ECU 25 may modulate the output of fluid pump 190 into working hydraulic fluid chamber 159 to open and unlock the lockup clutch 152. However, upon determining that the current vehicle speed is greater than the predefined minimum vehicle speed (block 207=YES), method 200 responsively advances to decision block 211, which will be discussed below. Conversely, if a PRNDL shift command from P/N to R is received (block 205=R), method 200 moves to signal output block 213 and responsively commands the torque converter assembly to lock for a direct driving connection between the motor and transmission. ECU 25 of FIG. 1, for example, may modulate the output of fluid pump 190 into working hydraulic fluid chamber 159 to close and lock the lockup clutch 152.

Method 200 thereafter executes decision block 211 to determine if a TCC lock command is received and any one or more of a predefined set of system operating conditions are present. By way of example, and not limitation, ECU 25 may monitor real-time motor output speed of motor 12, e.g., at rotor 28, and real-time transmission input speed of transmission 16, e.g., at first shaft 11, during a forward driving operating mode of vehicle 10 to determine if/when the two speeds are substantially equal to each other and the accelerator pedal of vehicle 10 is at least partially depressed. At that juncture, the powertrain control module (PCM) may wish to lock the TC assembly 14/114. If a TCC lock command is not received and/or at least one predefined operating condition is not concurrently present (block 211=NO), method 200 executes signal output block 209 and keeps the lockup clutch 152 open.

Responsive to receipt of the TCC lock command (block 211=YES), method 200 executes decision block 215 to determine if the TCC should be fully closed (lock) or partially closed (slip). Upon determining that the TCC should be fully closed (block 215=L), method 200 executes signal output block 213 and locks the TCC. The ECU 25 may command the lockup clutch 152 to close and drivingly connect the TC housing 156, 158 directly to the transmission 16, as indicated at signal output block 213. On the other hand, method 200 may automatically respond to a determination that the TCC should be partially closed (block 215=S) by executing process block 217 and initiating a TCC slip control protocol.

After unlocking the TCC at block 209 or locking the TCC at block 213 or slipping the TCC at block 217, method 200 advances to decision block 219 to determine if a subsequent PRNDL shift request is received with a request to transition the vehicle powertrain from forward or reverse to park or neutral. ECU 25 of FIG. 1, for example, may receive a (second) shift command signal from an in-vehicle shift knob/dial with a request to shift the EDU 18 from D/L/H/S to P/N. Alternatively, the ECU 25 may receive a different (fourth) shift command signal with a request to shift the EDU 18 from R to P/N. If a shift request is received (block 219=YES), method 200 may loop back to input/output block 203. Conversely, if a shift request is not received (block 219=NO), method 200 of FIG. 3 may loop back to decision block 205 or may advance to terminal block 221 and temporarily terminate.

Figure 4A:
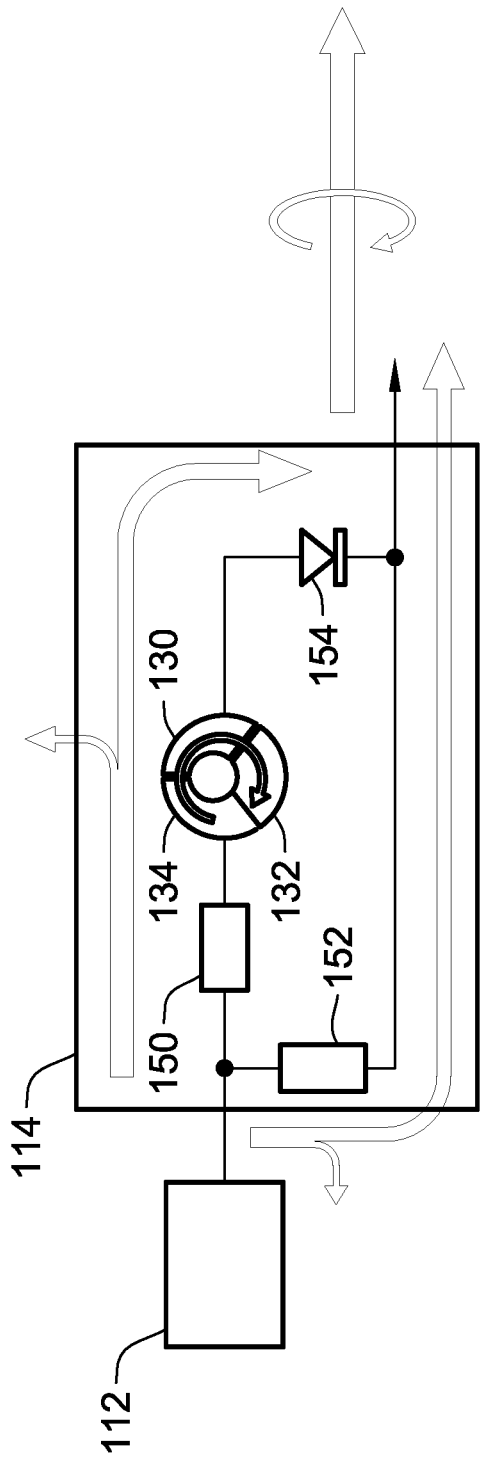
FIGS. 4A and 4B are schematic illustrations of the representative hydrodynamic torque converter assembly of FIG. 2 utilized as a heat-generating device for thermal management of the EDU in accordance with aspects of the present disclosure.
Figure 4B:
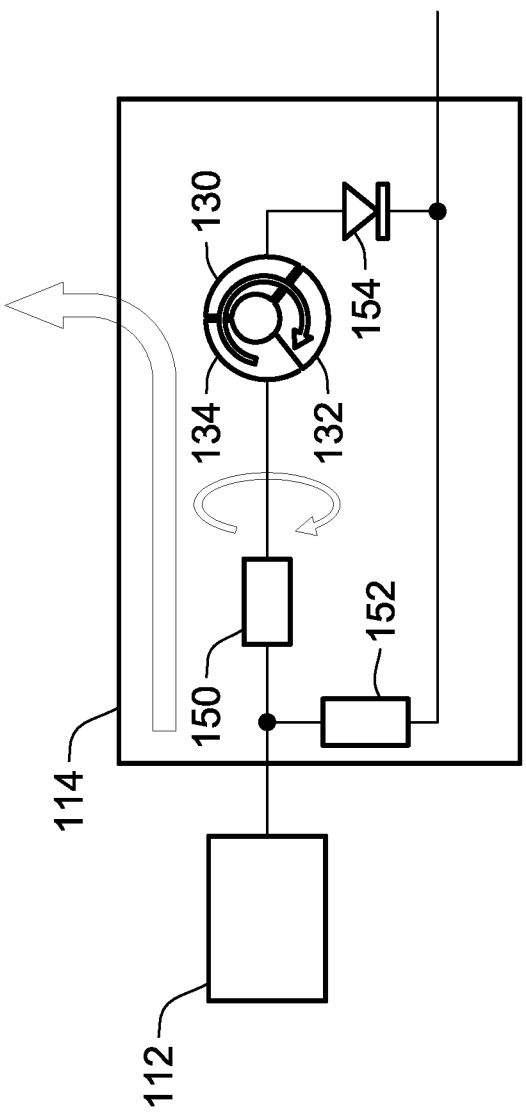

FIGS. 4A and 4B are schematic illustrations of the representative hydrodynamic torque converter assembly 114 of FIG. 2 operated jointly with an electric traction motor 112 to cooperatively output heat for thermal management of the powertrain system. When driving the vehicle 10 of FIG. 1 in cold conditions, for example, the TC assembly 114 may be operated with the PDC 150 locked and the TCC 152 slipping to generate heat for warming of the EDU 18, passenger compartment, and/or any other select segments of the vehicle 10. After locking the disconnect clutch 150 and slipping the lockup clutch 152, the motor 112 is operated at an "inefficient" torque output and the TCC operating mode selectively modified to meet driving demands while providing desired heat generation. For instance, when the powertrain is in a forward driving operating mode, the ECU 25 may monitor a real-time operating temperature of the electric motor 112. If the motor's current operating temperature is less than a minimum allowable motor temperature for vehicle propulsion (e.g., −20° C. base ambient temperature), the ECU 25 may responsively command the TC assembly 114 to execute a system preconditioning operation—vehicle driving, which may include: (1) commanding the disconnect clutch 150 to lock; (2) commanding the lockup clutch 152 to partially close and slip; and (3) commanding the electric motor 112 to output motor torque to the TC housing via the output member.

When the vehicle 10 is parked in cold conditions (e.g., −40° C. to 0° C. ambient), the TC assembly 114 may be operated with the PDC 150 locked and the TCC 152 unlocked to generate heat for warming of the EDU 18, passenger compartment, and/or any other select segments of the vehicle 10. With the park mode/brake engaged, and after locking the disconnect clutch 150 and opening the lockup clutch 152, the motor 112 is operated at an "inefficient" speed for providing desired heat generation. For instance, the vehicle 10 is started with the powertrain in neutral or park; the ECU 25 checks a real-time operating temperature of the electric motor 112. If the motor's current operating temperature is less than the minimum allowable motor temperature, the ECU 25 may responsively command the TC assembly 114 to execute a system preconditioning operation—vehicle parked, which may include: (1) commanding the powertrain to remain in park; (2) commanding the lockup clutch 152 to close; (3) commanding the disconnect clutch 150 to open; and (3) commanding the motor 112 to operate at or above a predefined minimum motor speed.

Disclosed TC architectures and attendant TC clutch control logic enable the use of hydrodynamic torque converters in electric-drive vehicles with a direct driving coupling between the TC and traction motor(s). With this configuration, the torque converter may be employed to boost the motor's torque output for vehicle launch and high-torque demand driving maneuvers, e.g., with TC torque multiplication and controlled TCC activation to enable direct motor-to-transmission torque transfer while maintaining high EV efficiencies. It may be desirable, for at least some implementations, to govern TC assembly operation with the following default conditions: neutral/park default TCC locked; reverse default TCC locked; and forward default TCC unlocked. For proper TC hydrodynamics, the fluid pump may be activated at launch in order to maintain charge pressure.

During low-temperature system operations, e.g., at or below freezing ambient temperatures for vehicle start in park or neutral, a friction brake system may be applied and the traction motor may be operated at a default speed to generate heat (e.g., 900-1200 rpm or higher, depending on k-factor) for EDU and vehicle cabin preconditioning. For unwanted powertrain disturbances, the lockup clutch may be selectively opened to dampen or isolate driveline excitations, such as motor torque ripples, road bumps, etc., thus eliminating the need for dedicated damping hardware. If equipped with a multi-speed transmission, the lockup clutch may be operated with low-slip control during gear shifts to smooth torque transients. Other options include implementing power down shifts to open the lockup clutch for TC torque boost. In addition, as the lockup clutch closes/locks: (1) a tip-in command may cause the torque converter to open or high-slip TCC operation to provide additional torque boost; and (2) a tip-out command may cause the TCC and DC to open to damp out fast drops in torque drop. A dedicated speed sensor may be employed to distinguish between the pump speed and turbine speed. If the TC is equipped with a single mechanical pump for fluid coupling and clutch control, the traction motor may be quickly accelerated for vehicle launches from stop to increase fluid pump output to bring the TC to capacity and maintain TC pressure at desired levels.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A torque converter assembly for drivingly connecting an electric motor to a transmission of a powertrain, the electric motor having an output member, and the transmission having an input member, the torque converter assembly comprising:
   a torque converter (TC) housing defining an internal fluid chamber and configured to drivingly connect to the output member to thereby receive torque generated by the electric motor;
   a TC output member attached to the TC housing and configured to drivingly connect to the input member to thereby transfer torque to the transmission;
   a turbine attached to the TC output member and including turbine blades rotatable within the internal fluid chamber;
   an impeller including impeller blades juxtaposed with the turbine blades and rotatable within the internal fluid chamber;
   a lockup clutch disposed inside the fluid chamber and operable to lock the TC housing to the TC output member; and
   an electronic system controller programmed to:
      receive a key-on signal indicative of a command to initialize the powertrain;
      receive an operating mode signal indicating the powertrain is in a neutral or park operating mode;
      receive a first shift signal indicative of a command to shift the powertrain from the neutral or park operating mode to a forward driving operating mode;

responsive to receipt of the first shift signal, command the lockup clutch to open;

receive a TCC lock signal indicative of a request to lock the lockup clutch; and responsive to receipt of the TCC lock signal, command the lockup clutch to close.

2. The torque converter assembly of claim 1, wherein the system controller is further programmed to:

receive a second shift signal indicative of a command to shift the powertrain from the forward driving operating mode to the neutral or park operating mode; and responsive to receipt of the second shift signal, command the lockup clutch to remain closed during a transition from the forward driving operating mode to the neutral or park operating mode.

3. The torque converter assembly of claim 1, wherein the system controller is further programmed to:

receive a third shift signal indicative of a command to shift the powertrain from the neutral or park operating mode to a rearward driving operating mode; and responsive to receipt of the third shift signal, command the lockup clutch to close.

4. The torque converter assembly of claim 3, wherein the system controller is further programmed to:

receive a fourth shift signal indicative of a command to shift the powertrain from the rearward driving operating mode to the neutral or park operating mode; and responsive to receipt of the fourth shift signal, command the lockup clutch to remain closed during a transition to the neutral or park operating mode.

5. The torque converter assembly of claim 1, wherein the powertrain is part of a motor vehicle with a manually activated electronic ignition system and a manually operated electronic mode shifter device, and wherein the key-on signal is received from a driver of the motor vehicle via the ignition system, and the operating mode signal is received from the mode shifter device.

6. The torque converter assembly of claim 1, wherein the system controller is further programmed to:

responsive to the powertrain being in the neutral or park operating mode, determine if a motor temperature of the electric motor is less than a minimum allowable motor operating temperature; and responsive to the motor temperature being less than the minimum allowable motor operating temperature, execute a system preconditioning operation, the system preconditioning operation including commanding the powertrain to remain in the park operating mode, commanding the lockup clutch to close, and commanding the electric motor to operate at or above a predefined minimum motor speed to thereby generate excess heat.

7. The torque converter assembly of claim 1, wherein the system controller is further programmed to:

determine if the powertrain is in the forward driving operating mode;

responsive to the powertrain being in the forward driving operating mode, determine if a motor temperature of the electric motor is less than a minimum allowable motor operating temperature; and responsive to the motor temperature being less than the minimum allowable motor operating temperature, execute a system preconditioning operation, the system preconditioning operation including commanding the lockup clutch to partially close and slip, and commanding the electric motor to output motor torque to the TC housing via the output member to thereby generate excess heat.

8. The torque converter assembly of claim 1, wherein the turbine blades are mounted to a turbine shell movably mounted onto the TC output member, and the impeller blades are mounted to an impeller shell movably mounted within the TC housing.

9. The torque converter assembly of claim 8, further comprising a disconnect clutch disposed inside the fluid chamber, between the impeller shell and the TC housing, and operable to lock the TC housing to the impeller.

10. The torque converter assembly of claim 9, wherein the disconnect clutch includes a disconnect clutch (DC) flange projecting from the impeller shell, the DC flange including a DC friction surface configured to friction-lock to the TC housing.

11. The torque converter assembly of claim 10, wherein the TC housing includes a pump cover circumscribing the impeller, a turbine cover circumscribing the turbine and rigidly mounted to the pump cover, and a DC clutch disc pack projecting from an inner surface of the pump cover, and wherein the DC friction surface includes a DC clutch plate pack interleaved with the DC clutch disc pack.

12. The torque converter assembly of claim 1, wherein the lockup clutch includes a TC clutch (TCC) hub slidably mounted onto the TC output member to rotate in unison therewith, the TCC hub including a TCC friction surface configured to friction-lock to the TC housing.

13. The torque converter assembly of claim 12, wherein the TC housing includes a pump cover circumscribing the impeller, a turbine cover circumscribing the turbine and rigidly mounted to the pump cover, and a TCC clutch disc pack projecting from an inner surface of the turbine cover, and wherein the TCC friction surface includes a TCC clutch plate pack interleaved with the TCC clutch disc pack.

14. A torque converter assembly for drivingly connecting an electric motor to a transmission of a powertrain, the electric motor having an output member, and the transmission having an input member, the torque converter assembly comprising:

a torque converter (TC) housing defining an internal fluid chamber and configured to drivingly connect to the output member to thereby receive torque generated by the electric motor;

a TC output member attached to the TC housing and configured to drivingly connect to the input member to thereby transfer torque to the transmission;

a turbine attached to the TC output member and including turbine blades rotatable within the internal fluid chamber;

an impeller including impeller blades juxtaposed with the turbine blades and rotatable within the internal fluid chamber;

a lockup clutch disposed inside the fluid chamber and operable to lock the TC housing to the TC output member; and an electronic system controller programmed to:

receive a first shift signal indicative of a command to shift the powertrain from a neutral or park operating mode to a forward driving operating mode;

responsive to receipt of the first shift signal, command the lockup clutch to open;

receive a TCC lock signal indicative of a request to lock the lockup clutch;

responsive to receipt of the TCC lock signal, command the lockup clutch to close;

receive a second shift signal indicative of a command to shift the powertrain from the forward driving operating mode to the neutral or park operating mode; and responsive to receipt of the second shift signal, command the lockup clutch to close or remain closed during a transition from the forward driving operating mode to the neutral or park operating mode.

15. The torque converter assembly of claim 14, wherein the system controller is further programmed to:
receive a key-on signal indicative of a command to initialize the powertrain;
receive an operating mode signal indicating the powertrain is in the neutral or park operating mode; and
responsive to receiving the operating mode signal, command the lockup clutch to close.

16. The torque converter assembly of claim 14, wherein the system controller is further programmed to:
receive a third shift signal indicative of a command to shift the powertrain from the neutral or park operating mode to a rearward driving operating mode; and
responsive to receipt of the third shift signal, command the lockup clutch to close.

17. The torque converter assembly of claim 16, wherein the system controller is further programmed to:
receive a fourth shift signal indicative of a command to shift the powertrain from the rearward driving operating mode to the neutral or park operating mode; and
responsive to receipt of the fourth shift signal, command the lockup clutch to remain closed during a transition to the neutral or park operating mode.

18. The torque converter assembly of claim 14, wherein the system controller is further programmed to:
determine if the powertrain is in the neutral or park operating mode;
responsive to the powertrain being in the neutral or park operating mode, determine if a motor temperature of the electric motor is less than a minimum allowable motor operating temperature; and
responsive to the motor temperature being less than the minimum allowable motor operating temperature, execute a system preconditioning operation including commanding the powertrain to remain in the park operating mode, commanding the lockup clutch to close, and commanding the electric motor to operate at or above a predefined minimum motor speed to thereby generate excess heat.

19. The torque converter assembly of claim 14, wherein the system controller is further programmed to:
determine if the powertrain is in the forward driving operating mode;
responsive to the powertrain being in the forward driving operating mode, determine if a motor temperature of the electric motor is less than a minimum allowable motor operating temperature; and
responsive to the motor temperature being less than the minimum allowable motor operating temperature, execute a system preconditioning operation including commanding the lockup clutch to partially close and slip, and commanding the electric motor to output motor torque to the TC housing via the output member to thereby generate excess heat.

20. A torque converter assembly for drivingly connecting an electric motor to a transmission of a powertrain, the electric motor having an output member, and the transmission having an input member, the torque converter assembly comprising:

a torque converter (TC) housing defining an internal fluid chamber and configured to drivingly connect to the output member to thereby receive torque generated by the electric motor;
a TC output member attached to the TC housing and configured to drivingly connect to the input member to thereby transfer torque to the transmission;
a turbine attached to the TC output member and including turbine blades rotatable within the internal fluid chamber;
an impeller including impeller blades juxtaposed with the turbine blades and rotatable within the internal fluid chamber;
a lockup clutch disposed inside the fluid chamber and operable to lock the TC housing to the TC output member; and
an electronic system controller programmed to:
receive a first shift signal indicative of a command to shift the powertrain from a neutral or park operating mode to a forward driving operating mode;
responsive to receipt of the first shift signal, command the lockup clutch to open;
receive a second shift signal indicative of a command to shift the powertrain from the neutral or park operating mode to a rearward driving operating mode;
responsive to receipt of the second shift signal, command the lockup clutch to close;
receive a TCC lock signal indicative of a request to lock the lockup clutch; and
responsive to receipt of the TCC lock signal, command the lockup clutch to close.

21. A torque converter assembly for drivingly connecting an electric motor to a transmission of a powertrain, the electric motor having an output member, and the transmission having an input member, the torque converter assembly comprising:

a torque converter (TC) housing defining an internal fluid chamber and configured to drivingly connect to the output member to thereby receive torque generated by the electric motor;
a TC output member attached to the TC housing and configured to drivingly connect to the input member to thereby transfer torque to the transmission;
a turbine attached to the TC output member and including turbine blades rotatable within the internal fluid chamber;
an impeller including impeller blades juxtaposed with the turbine blades and rotatable within the internal fluid chamber;
a lockup clutch disposed inside the fluid chamber and operable to lock the TC housing to the TC output member; and
an electronic system controller programmed to:
determine if the powertrain is in a neutral or park operating mode;
responsive to the powertrain being in the neutral or park operating mode, determine if a motor temperature of the electric motor is less than a minimum allowable motor operating temperature;
responsive to the motor temperature being less than the minimum allowable motor operating temperature, execute a system preconditioning operation including commanding the powertrain to remain in the neutral or park operating mode, commanding the lockup clutch to close, and commanding the electric motor to operate at or above a predefined minimum motor speed to generate excess heat;

receive a first shift signal indicative of a command to shift the powertrain from the neutral or park operating mode to a forward driving operating mode;

responsive to receipt of the first shift signal, command the lockup clutch to open;

receive a TCC lock signal indicative of a request to lock the lockup clutch; and responsive to receipt of the TCC lock signal, command the lockup clutch to close.

22. A torque converter assembly for drivingly connecting an electric motor to a transmission of a powertrain, the electric motor having an output member, and the transmission having an input member, the torque converter assembly comprising:

a torque converter (TC) housing defining an internal fluid chamber and configured to drivingly connect to the output member to thereby receive torque generated by the electric motor;

a TC output member attached to the TC housing and configured to drivingly connect to the input member to thereby transfer torque to the transmission;

a turbine attached to the TC output member and including turbine blades rotatable within the internal fluid chamber;

an impeller including impeller blades juxtaposed with the turbine blades and rotatable within the internal fluid chamber;

a lockup clutch disposed inside the fluid chamber and operable to lock the TC housing to the TC output member; and an electronic system controller programmed to:

receive a first shift signal indicative of a command to shift the powertrain from a neutral or park operating mode to a forward driving operating mode;

responsive to receipt of the first shift signal, command the lockup clutch to open;

receive a TCC lock signal indicative of a request to lock the lockup clutch;

responsive to receipt of the TCC lock signal, command the lockup clutch to close;

determine if the powertrain is in the forward driving operating mode;

responsive to the powertrain being in the forward driving operating mode, determine if a motor temperature of the electric motor is less than a minimum allowable motor operating temperature; and responsive to the motor temperature being less than the minimum allowable motor operating temperature, execute a system preconditioning operation including commanding the lockup clutch to partially close and slip, and commanding the electric motor to output motor torque to the TC housing via the output member to thereby generate excess heat.

* * * * *